US006651147B2

(12) United States Patent
Burns et al.

(10) Patent No.: US 6,651,147 B2
(45) Date of Patent: Nov. 18, 2003

(54) DATA PLACEMENT AND ALLOCATION USING VIRTUAL CONTIGUITY

(75) Inventors: Randal Chilton Burns, Sunnyvale, CA (US); Darrell D. E. Long, Soquel, CA (US); Robert Michael Rees, Los Gatos, CA (US)

(73) Assignee: International Business Machines Corporation, Armonk, NY (US)

( * ) Notice: Subject to any disclaimer, the term of this patent is extended or adjusted under 35 U.S.C. 154(b) by 100 days.

(21) Appl. No.: 09/850,824

(22) Filed: May 8, 2001

(65) Prior Publication Data

US 2002/0169932 A1 Nov. 14, 2002

(51) Int. Cl.$^7$ ............................................. G06F 12/00
(52) U.S. Cl. ........................ 711/154; 711/111; 711/217
(58) Field of Search ............................... 711/154, 161, 711/162, 111, 217

(56) References Cited

U.S. PATENT DOCUMENTS

| | | | | |
|---|---|---|---|---|
| 5,897,662 A | * | 4/1999 | Corrigan et al. | 711/173 |
| 6,341,341 B1 | * | 1/2002 | Grummon et al. | 711/162 |
| 6,381,677 B1 | * | 4/2002 | Beardsley et al. | 711/113 |
| 6,427,184 B1 | * | 7/2002 | Kaneko et al. | 711/113 |

OTHER PUBLICATIONS

Pechura et al. "Estimating file access time of floppy disks", Computing practices Communications of the ACM v.26 n.10 Oct. 1983.*
Albers et al, "Average–Case Analysis of First Fit and Random Fit Bin Packing", Proc of the 9th annual ACM–SIAM symposium on Discrete Algorithms, Jan. 1998.*
Maymournkov, "Divergence–proving Techniques for Best Fit Bin Packing and Random Fit," Senior Thesis Harvard College, May 7, 2001.*
Insession Technologies, "A Review of Technical Features in AutoDBA", 2001 http://www.insession.com/autoDBA/autodba_wp.pdf.*

* cited by examiner

Primary Examiner—Reginald G. Bragdon
Assistant Examiner—Paul A Baker
(74) Attorney, Agent, or Firm—John L. Rogitz

(57) ABSTRACT

A data storage system randomly determines a start offset at which to write objects to a storage medium. For updated blocks of the object, e.g., for blocks written during copy-on-write as part of a point-in-time snapshot, the updated block is written in the region of the original file or as close thereto as possible to achieve "virtual contiguity". Subsequent reads of the object read entire region containing both the object and, potentially, "chaff" data other than the object. The "chaff" data is discarded by the I/O system or file system using, e.g., a bit mask, subsequent to the read.

21 Claims, 3 Drawing Sheets

OVERALL
LOGIC

ALLOCATING REGIONS - POLICY 1

ALLOCATION - POLICY 2

ALLOCATION - POLICY 3

ALLOCATION - POLICY 4

DATA PLACEMENT AND ALLOCATION USING VIRTUAL CONTIGUITY

BACKGROUND OF THE INVENTION

1. Field of the Invention

The present invention relates to allocating electronic storage space for data storage.

2. Description of the Related Art

Data is placed on storage media, such as disk drives, in physical regions referred to as "blocks". The storage system, such as a database or file system, essentially divides an object such as a file to be stored into block-sized portions, and then places them in the block-size regions of the disk drive. When a portion of a file is smaller than a block, the entire block nonetheless is allocated. The unused space in the block is referred to as "internal fragmentation".

Conventional allocation schemes such as those disclosed in Knuth, *The Art of Computer Programming*, vol. 1, Addison-Wesley Longman, Third Ed., 1998 allocate free space on an empty disk drive from first block to last block sequentially. This means that while initially, a file might be allocated a contiguous series of physical blocks, subsequent updates to the file will be placed in a disk region that is physically spaced from the remainder of the file by other blocks that have been recorded in the interim. This happens when, for instance, a point-in-time snapshot of a file system is to be made, with only changes to file blocks since the last snapshot being recorded. In such an instance, if an original block B of a three-block file has been changed to a modified block B', the original three blocks remain stored together as a record of the original version of the file, and the modified block B' is stored apart from the other blocks. Should a user subsequently desire to access the most recent version of the file, the system retrieves the two original unchanged blocks and the modified block B'.

The present invention understands that a disk drive can read and deliver a single large read or write (say, 256 Kbytes long) in less time than it takes to perform two very much smaller operations. This is because the read head, which must move along the disk from one operation to the next, can be physically moved only so fast, with even a small movement generally consuming a large amount of time as compared to the time required to execute a single long read or write. For this reason, larger block sizes are advantageous. Competing with this, however, is the fact that smaller block sizes result in less internal fragmentation, i.e., less wasted space on the disk drive. That is, as block size increases, so does internal fragmentation.

With the above considerations in mind, the present invention critically observes that sequentially allocating free blocks on a disk can result in later versions of file blocks being stored apart from the remainder of the file, particularly in cases of point-in-time snapshots. Moreover, the present invention recognizes that large file blocks are desirable from a performance view, and that apart from the block size, it is desirable to minimize I/O operations, i.e., head movement. Accordingly, the present invention recognizes a need to provide a system in file blocks associated with a single file are generally stored contiguous to each other, even if written to disk at different times, which could otherwise result in data "sparseness". The present invention also recognizes a need to minimize I/O operations when reading or writing file blocks when the blocks might not be exactly contiguous with each other. The solutions below have been provided to address one or more of the above-recognized needs.

SUMMARY OF THE INVENTION

A general purpose computer is programmed according to the inventive steps herein to allocate storage space in a storage system. The invention can also be embodied as an article of manufacture—a machine component—that is used by a digital processing apparatus and which tangibly embodies a program of instructions that are executable by the digital processing apparatus to execute the present logic. This invention is realized in a critical machine component that causes a digital processing apparatus to perform the inventive method steps herein.

The invention can be implemented by a computer system including a data storage system having and a processor associated with a data storage system. The processor has logic for receiving a data object for storage, and randomly determining an original position on the storage medium to which to write the object. Updated blocks of the object are written in the original position or as close thereto as possible pursuant to, e.g., a copy-on-write operation of a point-in-time snapshot, or when data is written through multiple allocations. When an object is to be read from the medium, an entire region containing both the object and "chaff" data other than the object is read, with the "chaff" data being discarded subsequent to reading. The chaff can be discarded by a file subsystem, or prior to delivery to the subsystem by an input/output processor using a bit mask provided by the file subsystem.

In a preferred embodiment, the logic can determine a minimum desired data region density on the storage medium. Data is written into the region at least until the minimum desired data region density for the region is reached. The minimum desired data region density can be determined dynamically during system operation.

In another aspect, a computer program device includes a computer program storage device that is readable by a processor. A program is on the program storage device and includes instructions which can be executed by the processor for allocating space in a data storage system. The program includes computer readable code means for randomly determining, for each object, a start offset on a storage medium associated with the storage system. Computer readable code means write each object starting at its respective randomly determined start offset.

In still another aspect, a computer-implemented method for transferring data objects to and from a storage medium includes writing a first data object to a region of a data storage medium. A portion of a second object can be physically juxtaposed between two portions of the first object. The It first object is read along with the interposed portions of the second objects, and then subsequently the read portions of the second object are discarded.

The details of the present invention, both as to its structure and operation, can best be understood in reference to the accompanying drawings, in which like reference numerals refer to like parts, and in which:

DETAILED DESCRIPTION OF THE PREFERRED EMBODIMENTS

Figure 1:
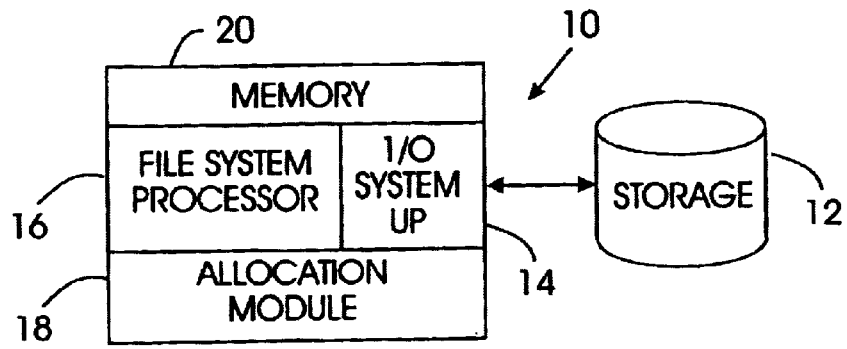
FIG. 1 is a schematic diagram showing the system of the present invention.

Referring initially to FIG. 1, a system is shown, generally designated 10, for storing blocks of data on a data storage medium 12. As set forth more fully below, an input/output (I/O) processor 14 is associated with the system 10 to control data flow to the storage medium 12, and a data storage system processor 16 interacts with the I/O processor (or indeed can be implemented by the I/O processor) to send and receive data from the storage 12. Either one or both of the processors 14, 16 can access an allocation module 18 to undertake the logic set forth herein. A memory 20 can be provided in the system 10.

The system 10 can be a file system, database system, or other system that must allocate space for variable-sized data objects. In one intended embodiment, the processor or processors (computers) of the present invention may be personal computers made by International Business Machines Corporation (IBM) of Armonk, N.Y., or any computers, including computers sold under trademarks such as AS400, with accompanying IBM Network Stations.

The flow charts herein illustrate the structure of the logic embodied by the module 18 and executed by the processor 14 and/or processor 16 as embodied in computer program software. Those skilled in the art will appreciate that the flow charts illustrate the structures of logic elements, such as computer program code elements or electronic logic circuits, that function according to this invention. Manifestly, the invention is practiced in its essential embodiment by a machine component that renders the logic elements in a form that instructs a digital processing apparatus (that is, a computer) to perform a sequence of function steps corresponding to those shown.

In other words, the flow charts may be embodied in a computer program that is executed by a processor as a series of computer-executable instructions. These instructions may reside, for example, in a program storage device of the system 10. The program storage device may be RAM, or a magnetic or optical disk or diskette, DASD array, magnetic tape, electronic read-only memory, or other appropriate data storage device. In an illustrative embodiment of the invention, the computer-executable instructions may be lines of compiled C++ compatible code.

Figure 2:
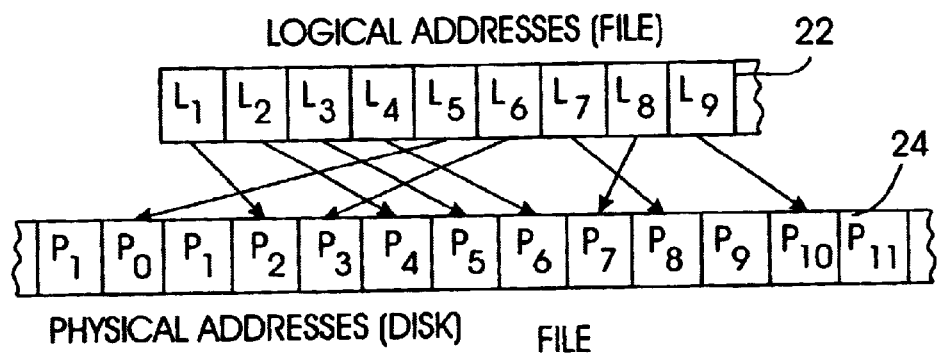
FIG. 2 is a schematic diagram illustrating logical-to-physical address mapping.

Referring briefly to FIG. 2, the mapping of logical file blocks to physical disk blocks is illustrated. As shown, a sequence of logical blocks 22 in an object such as a file are mapped to physical locations 24 on a disk. However, the order of the logical blocks 22 need not be maintained to in physical storage, as envisioned herein. Per the present invention, however, the physical locations 24 are more or less contiguous with each other, with an occasional location not devoted to the file (e.g., locations P1 and P9) being interspersed with locations that are associated with the file. How the present invention deals with this is discussed further below.

Figure 3:
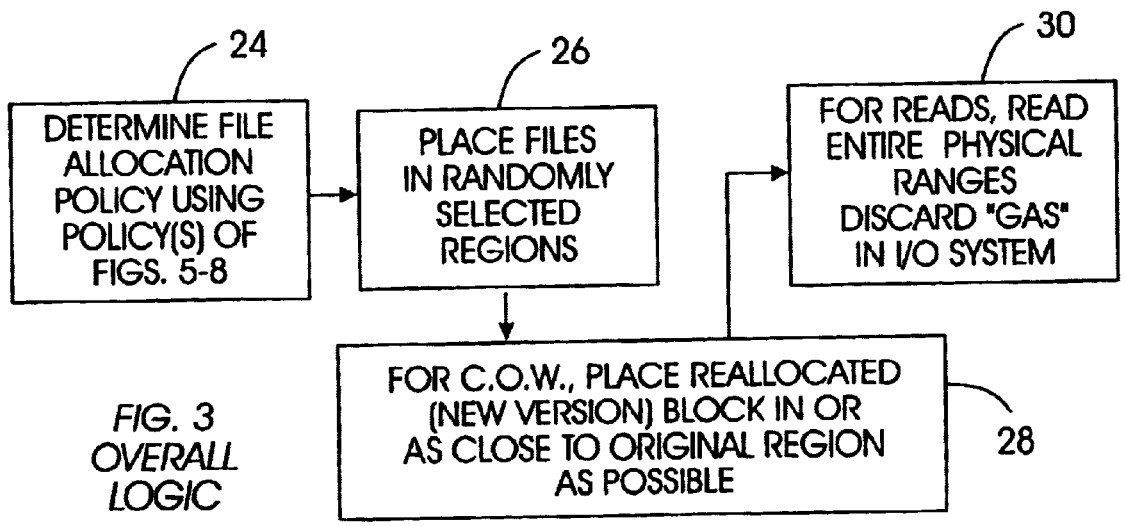
FIG. 3 is a flow chart showing the present logic.

FIG. 3 shows the logic of present invention. While for ease of disclosure the discussion refers to "files" and "file systems", it is to be understood that the principles herein apply to any objects that are stored in random access storage systems, including database systems.

Commencing at block 24, a file allocation determination is made in accordance with one or more of the policies discussed in greater detail below in reference to FIGS. 5–8.

Moving to block 26, each file to be stored is written to a random physical location on the disk. More specifically, a start offset on the disk is determined randomly for each file to be written. A forward search from the start offset is then undertaken to find a contiguous set of physical blocks that can store the entire file. In contrast to prior systems that systematically consume contiguous blocks on the disk, this randomness promotes uniform storage density across the disk.

Proceeding to block 28, assume a copy-on-write operation for an updated version of a file block has been initiated as part of a point-in-time snapshot. These principles also apply to data that is written through multiple allocations. At block 28 the updated version of the block is stored within the same physical region as the original file and preferably contiguous thereto, or as close as possible to the original block. Owing to the random selection of start offsets, this is possible, since the data storage density of the disk is more or less uniform. In other words, because successive files are copied to random locations of the disk, free space will likely be contiguous to each originally-allocated file, thereby making possible the subsequent reallocation of an updated block near or indeed contiguous with the original file. In this way, the file blocks, both original and updated, are kept "virtually contiguous".

Moving to block 30 of FIG. 3, for subsequent file reads, the entire physical range of the file is read, including blocks that might be interspersed with blocks of the file being read but that might not themselves be part of the file. Such blocks are referred to herein as "chaff", and can result from copy-on-write allocations that keep updated files versions close, but not contiguous to, original file blocks.

Figure 4:
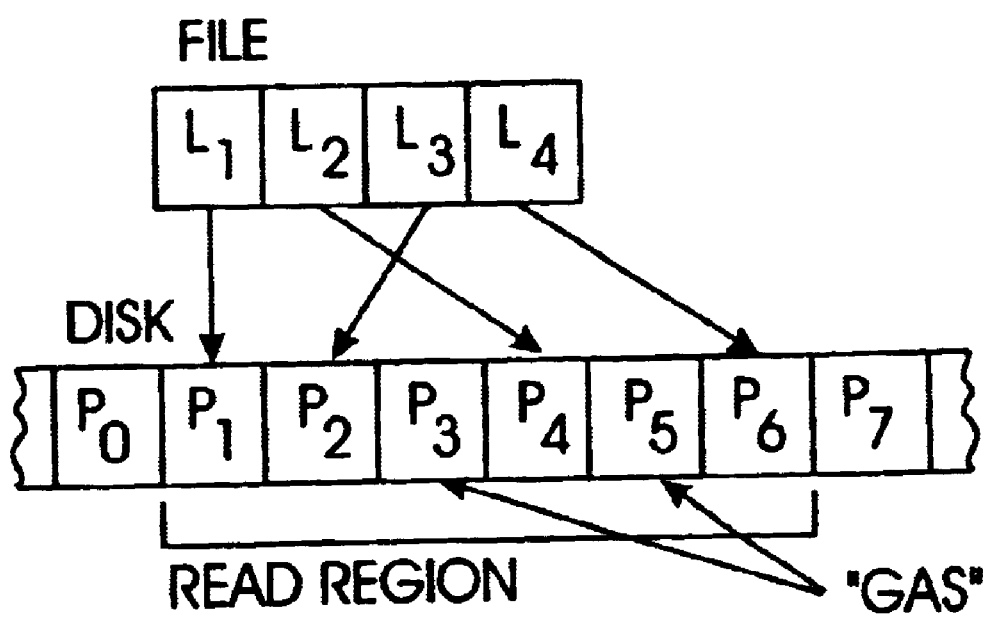
FIG. 4 is a schematic diagram illustrating logical-to-physical address mapping after a copy-on-write for a point-in-time snapshot in accordance with the present invention.
Figure 5:
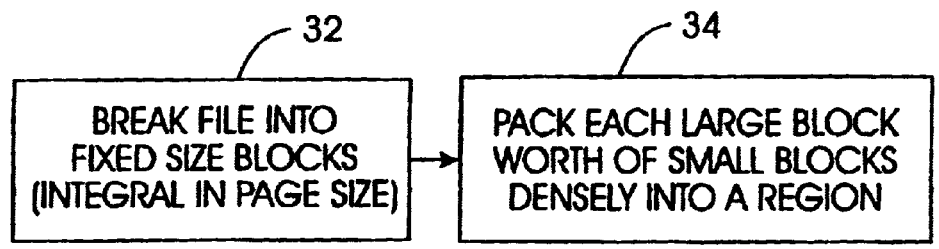
FIGS. 5–8 are flow charts showing respective file region allocation policies.

FIG. 4 illustrates this. As shown, the logical blocks L1, L2, L3, and L4 of a file to be read have been stored in respective physical locations P1, P4, P2, and P6. Physical locations P3 and P5 are empty or dedicated to files other than the one being read. In any case, physical locations P3 and P5 are "chaff". Nonetheless, to optimize performance by minimizing I/O operations, the entire physical range of the file, from P1 to P6, is read. The "chaff" data in locations P3 and P5 is later discarded, by the I/O processor 14 or file system processor 16.

Implementing the discarding of chaff in the I/O subsystem advantageously minimizes data transferred between the I/O subsystem and file subsystem. The file subsystem must instruct the I/O subsystem as to what is chaff. One way to accomplish this is for the file system processor 16 to construct a bit mask using the allocated region of the file's start offset and size, with masked bits representing chaff to be discarded by the I/O processor 14.

FIGS. 5–8 show various allocation policies that can be determined at block 24. Commencing at block 32 of FIG. 5, in one policy multiple blocks of a file can be grouped into larger fixed size blocks that have sizes which are integrals of the page size of the system memory 20. At block 34, each large block's worth of small blocks is packed into a disk region. This policy has the advantage of maintaining spatial locality.

Figure 6:
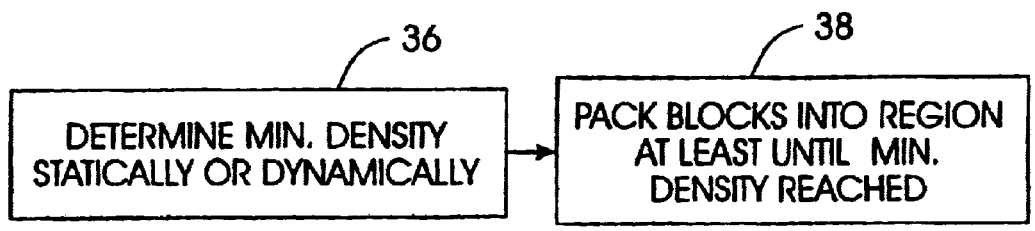

At block 36 of FIG. 6, a minimum region density is determined and then at block 38 blocks from multiple successive files being written to disk are packed into regions at least until the minimum density is reached, at which time another region is selected. The density can be determined once (statically and a priori) or dynamically, using disk space utilization information or other criteria. This policy essentially varies the "large block size" of the policy shown in FIG. 5.

Figure 7:
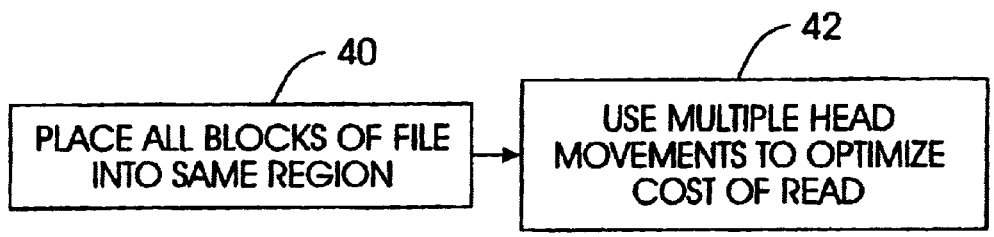

FIG. 7 shows yet another policy wherein all blocks of a file are placed in the same region at block 40. At block 42, multiple head movements are used in such a way as to optimize the cost of reading data based on disk drive parameters. This policy simply acknowledges that under some circumstances, multiple head movements might be desired.

Figure 8:
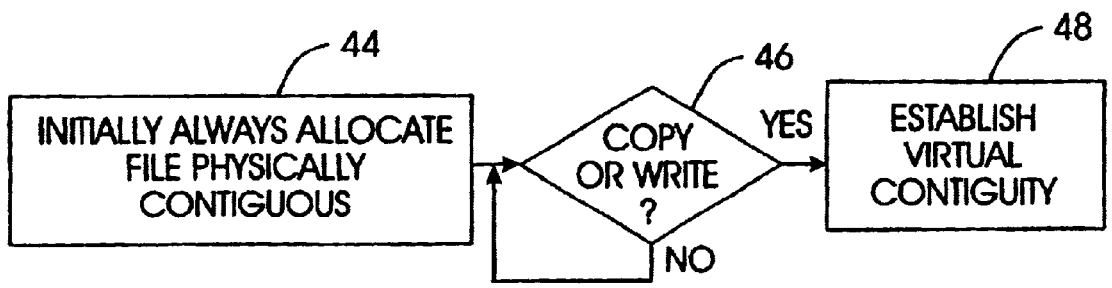

FIG. 8 shows that at block 44, the blocks of original versions of files are always initially allocated to physically contiguous disk blocks. When it is determined that a copy on write or other updating situation is to be implemented at decision diamond 46, the above-described virtual contiguity—writing updated block versions contiguous to or as close as possible to the original file—is implemented at block 48. The policies above can be used singly or in combination with each other. In one preferred embodiment, the policies shown in FIGS. 6 and 8 are used together.

Not only is the above-described "virtual contiguity" beneficial for files that are written through copy-on-write, but also for files that are written through multiple allocations. That is, as understood herein files can be allocated discontiguously when they are created/allocated through multiple writes executed at different times. If a file has been allocated and other data has been placed next to that allocation, a subsequent write unfortunately will not be able to extend the current allocation in place. Instead, the new data will be written to some other storage locations. The present virtual contiguity mitigates this problem by making the later allocation for the file as near as possible to the file's previous allocation and then reading both allocations in a single disk I/O operation, While the particular DATA PLACEMENT AND ALLOCATION USING VIRTUAL CONTIGUITY as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular means "at least one". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for".

We claim:

1. A computer system, comprising:
   a data storage system including at least one storage medium and at least one processor having logic for undertaking method acts comprising:
   receiving a data object for storage;
   randomly determining an original location on the storage medium to which to write the object;
   for an updated block of the object, writing the block in the original location;
   reading an object from the medium by reading an entire region containing both the object and "chaff" data other than the object; and
   discarding the "chaff" data subsequent to the act of reading.

2. The system of claim 1, wherein the act of discarding is undertaken by an input/output processor.

3. The system of claim 1, wherein the act of discarding is undertaken by a file system processor.

4. The system of claim 1, wherein the logic further undertakes method acts comprising:
   determining a minimum desired data region density on the storage medium; and
   writing data into the original location at least until the minimum desired data region density for the location is reached.

5. The system of claim 4, wherein the minimum desired data region density is determined dynamically during system operation.

6. The system of claim 1, wherein the updated version is written as part of a copy-on-write operation of a point-in-time snapshot.

7. The system of claim 1, wherein the "chaff" data is discarded using a bitmap.

8. A computer program device comprising:
   a computer program storage device readable by a processor and
   a program on the program storage device and including instructions executable by the processor for allocating space for plural data objects in a data storage system, the program comprising:
   computer readable code means for randomly determining, for each object, a start offset on a storage medium associated with the storage system; and
   computer readable code means for writing each object starting at its respective randomly determined start offset; and
   computer readable code means for writing an updated block of an object as close to an original version as possible.

9. The computer program device of claim 8, further comprising:
   computer readable code means for reading an object from the medium by reading an entire region containing both the object and "chaff" data other than the object; and
   computer readable code means for discarding the "chaff" data subsequent to reading the data.

10. The computer program device of claim 9, further comprising:
    computer readable code means for determining a minimum desired data region density on the storage medium; and
    computer readable code means for writing data into the region at least until the minimum desired data region density for the region is reached.

11. The computer program device of claim 10, wherein the means for determining the minimum desired data region density dynamically determines the minimum desired data region density during system operation.

12. The computer program device of claim 8, wherein the updated block is written as part of a copy-on-write operation of a point-in-time snapshot.

13. A computer-implemented method for transferring data objects to and from a storage medium, comprising:

writing at least first portions of a first data object to a first region of a data storage medium, at least a second portion of at least a second object being physically juxtaposed on the medium between at least two first portions;

reading the first and second portions together; and subsequent to the reading act, discarding the second portion.

14. The method of claim 13, wherein the act of discarding is undertaken by an input/output processor.

15. The method of claim 13, wherein the act of discarding is undertaken by a file system processor.

16. The method of claim 13, further comprising:

receiving a data object for storage; and randomly determining an original position on the storage medium to which to write the object.

17. The method of claim 16, further comprising:

for an updated block of the object, writing the up dated block in the original position or as close thereto as possible.

18. The method of claim 17, wherein the updated version is written as part of a copy-on-write operation of a point-in-time snapshot.

19. The method of claim 13, further comprising:

determining a minimum desired data region density on the storage medium; and writing data into the region at least until the minimum desired data region density for the region is reached.

20. The method of claim 19, wherein the minimum desired data region density is determined dynamically.

21. The method of claim 13, wherein the second portion is discarded using a bitmap.

* * * * *